United States Patent [19]

Matsuda et al.

[11] 4,016,123

[45] Apr. 5, 1977

[54] PROCESS FOR PREPARATION OF CATIONIC RESIN AQUEOUS EMULSIONS

[75] Inventors: Kazuo Matsuda; Hidemasa Ohmura, both of Wakayama; Yukihisa Niimi, Osaka, all of Japan

[73] Assignee: Kao Soap Co., Ltd., Tokyo, Japan

[22] Filed: July 11, 1975

[21] Appl. No.: 595,018

[30] Foreign Application Priority Data

July 18, 1974 Japan .............................. 49-82618

[52] U.S. Cl. ............... 260/29.2 TN; 260/77.5 AM; 428/425

[51] Int. Cl.$^2$ ..................... C08J 3/06; C08L 75/02; C08L 75/12

[58] Field of Search ............ 260/29.2 TN, 77.5 AM

[56] References Cited

UNITED STATES PATENTS

| | | | |
|---|---|---|---|
| 3,551,288 | 12/1970 | Ziemann et al. | 260/29.2 TN |
| 3,836,493 | 9/1974 | Matsuda et al. | 260/29.2 TN |
| 3,892,696 | 7/1975 | Wood | 260/29.2 TN |
| 3,948,837 | 4/1976 | Schmitt et al. | 260/29.2 TN |

*Primary Examiner*—Allan Lieberman
*Attorney, Agent, or Firm*—Woodhams, Blanchard and Flynn

[57] ABSTRACT

A process for the preparation of cationic resin aqueous emulsions useful for treating fiber-containing articles, comprising reacting an isocyanate-terminated urethane prepolymer with an excess of a polyalkylene-polyamine to form a polyurethane-urea-polyamine, reacting a part of the amino groups in the thus-formed polyurethane-urea-polyamine with a compound selected from the group consisting of alkyl isocyanates having an alkyl group of 12 to 22 carbon atoms, acyl chlorides having an alkyl group of 12 to 22 carbon atoms and $\alpha$-olefin epoxides having 12 to 22 carbon atoms, thereby to introduce a long-chain alkyl group into the molecule of the polyurethane-urea-polyamine, and mixing the alkyl-containing polyurethane-urea-polyamine with an aqueous solution of an acid thereby to convert the remaining amino groups to cations.

7 Claims, No Drawings

PROCESS FOR PREPARATION OF CATIONIC RESIN AQUEOUS EMULSIONS

FIELD OF THE INVENTION

This invention relates to a process for the preparation of cationic resin aqueous emulsions useful for treating fiber-containing articles.

DESCRIPTION OF THE PRIOR ART

It is well known in the art that polyurethane resins have good elasticity, and they are widely used as adhesives, binders for non-woven fabrics and resins for the production of artificial leathers. Most of them are of the solvent type, that is, they are used in the form of solutions in organic solvents.

Treating agents for fibers, such as softeners, antistatic agents and resin processing agents, are generally applied in aqueous systems. Accordingly, when polyurethane resins are used in combination with ordinary fiber-treating agents, it is desired that they are water-soluble or they take the form of an aqueous emulsion.

Although polyurethane resins are excellent in elastomeric properties, since they contain in the molecule many hydrogen groups of carboamides, the cohesive force between molecules is great and they are poorly soluble in non-polar solvents. Therefore, it is generally difficult to obtain aqueous emulsions of polyurethane resins.

It is known in the art that a stable aqueous emulsion can be obtained by preparing a polyurethane-urea-polyamine by reacting an isocyanate-terminated urethane prepolymer with an excess of a polyalkylene-polyamine and mixing the polyurethane-urea-polyamine with an aqueous solution of an acid. This emulsion, when dried, gives a product possessing excellent rubbery elasticity and this product is valuable as a binder for fibers, papers, leathers, woods and construction materials, but it is insufficient in the softness required for fiber-treating agents.

SUMMARY OF THE INVENTION

We have discovered that when a polyurethane-urea-polyamine such as mentioned above is partially reacted with a compound having a long-chain alkyl group, thereby to introduce this long-chain alkyl group into the molecule of the polyurethane-urea-polyamine, and the remaining amino groups are then converted to cations, there is obtained an aqueous resin emulsion which is an excellent fiber-treating agent and which can impart to fibers not only good elasticity and crease resistance, but also a soft touch and excellent wash resistance. Based on this discovery, we have now completed this invention.

More specifically, in accordance with this invention, there is provided a process for the preparation of cationic resin aqueous emulsions useful for treating fiber-containing articles, which comprises reacting an isocyanate-terminated urethane prepolymer with an excess of a polyalkylene-polyamine to form a polyurethane-urea-polyamine, reacting a part of the amino groups in the thus-formed polyurethane-urea-polyamine with a compound selected from the group consisting of alkyl isocyanates having an alkyl group of 12 to 22 carbon atoms, acyl chlorides having an alkyl group of 12 to 22 carbon atoms and α-olefin epoxides having from 12 to 22 carbon atoms, thereby to introduce a long-chain alkyl group into the molecule of the polyurethane-urea-polyamine, and mixing the alkyl-containing polyurethane-urea-polyamine with and aqueous solution of an acid thereby to convert the remaining amino groups to cations.

The polyurethane-urea-polyamine used in this invention is obtained by reacting an isocyanate-terminated urethane prepolymer formed from a polyhydroxyl compound and an excess of a polyfunctional isocyanate, with a polyalkylene-polyamine in a ketone type solvent.

As the polyfunctional isocyanate used for production of the urethane prepolymer, there are preferably employed, for example, aromatic, aliphatic and alicyclic diisocyanates such as 1,5-naphthylene diisocyanate, 4,4'-diphenylmethane diisocyanate, 4,4'-diphenyldimethylmethane diisocyanate, dialkyldiphenylmethane diisocyanates, tetraalkydiphenylmethane diisocyanates, 4,4'-dibenzyl diisocyanate, 1,3-phenylene diisocyanate, 1,4-phenylene diisocyanate, toluylene diisocyanate, chlorinated isocyanates, brominated isocyanates, phosphorus-containing isocyanates, butane-1,4-diisocyanate, hexane-1,6-diisocyanate, dicyclohexylmethane diisocyanate, cyclohexane-1,4-diisocyanate, xylylene diisocyanate, and the like.

The polyhydroxyl compound for preparing the urethane prepolymer that is used in this invention has a molecular weight of 200 to 10,000. Any of the known polyhydroxyl compounds customarily used for preparation of polyurethanes can be employed. For example, there are used polyethers, polyesters, polyester amides, polyacetals, polythioethers, polybutadiene glycols, and the like.

As the polyethers that can be employed as the polyhydroxyl compound, there can be mentioned homopolymers, copolymers and graft copolymers of tetrahydrofuran, ethylene oxide, propylene oxide and butylene oxide. Further, homogeneous or mixed polyethers formed by condensation of hexanediol, methylhexanediol, heptanediol and octanediol can be employed. Still further, propoxylated and ethoxylated glycols can be used.

As the polythioethers that can be employed as the polyhydroxyl compound, condensation products of thioglycols alone or with other glycols are especially preferred.

As the polyacetals, there can be mentioned water-soluble polyacetals derived from hexanediol and formaldehyde or from 4,4'-dihydroxyethoxydiphenyldimethylmethane and formaldehyde.

As typical examples of the polyesters, there can be mentioned polyester glycols obtained by dehydrating condensation of dibasic acids and saturated or unsaturated low-molecular weight glycols such as ethylene glycol, propylene glycol, 1,3-butanediol, 1,4-butanediol, neopentyl glycol, pentanediol, hexanediol, octanediol, 2-ethyl-1,3-hexanediol, 1,4-butynediol, bisphenol A, diethylene glycol, dipropylene glycol and the like, and polyester glycols obtained by ring-opening polymerization of cyclic ester compounds.

If desired, these polyols can be used in combination with customarily employed glycols such as ethylene glycol, diethylene glycol, triethylene glycol, butanediol, propanediol, 1,6-hexanediol and neopentyl glycol.

As the polyalkylene-polyamine used in this invention, there can be mentioned various polyalkylene-polyamines including polyethylene-polyamines, polypropylene-polyamines and polybutylenepolyamines. The polyalkylene-polyamine used in this invention contains nitrogen atoms connected by from 2 to about 4 of —$C_nH_{2n}$— groups in which n is a number of at least 1, usually from 2 to 6. The nitrogen atoms may be bonded to adjacent carbon atoms in the group —$C_nH_{2n}$—, but they are not bonded to the same carbon atom.

The polyamines have the formula

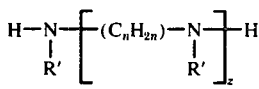

wherein $n$ is from 1 to 6, $z$ is 2 to 4, and $R'$, which can be the same or different, are hydrogen, alkyl having 1 to 4 carbon atoms or hydroxyalkyl having one to 4 carbon atoms.

More specifically, there can be employed not only such polyamines as diethylene-triamine, triethylene-tetraamine, tetraethylene-pentamine and dipropylene-triamine, but also polyamine mixtures and various purified polyamine materials. Further, hydroxyalkyl-substituted-polyamines can be employed.

In some cases, in order to change the density of hydrophilic groups in the aqueous emulsion obtained by this invention, or to improve the properties of a film made from the emulsion, it is preferred to change or increase the distance between adjacent active hydrogen-containing amino groups in the molecule of the polyurethane-urea-polyamine molecule. This can be accomplished by substituting a part of the polyalkylene-polyamine with ethylene diamine, propylene diamine, hexamethylene diamine or an alkylene oxide, acrylonitrile or acrylic ester adduct to such amine. In this case, up to about 80 molar % of the polyalkylene-polyamine can be replaced with a molecular equivalent amount of such polyamine, but in general, the intended object can be attained by substitution of 50 molar % or less of the polyalkylene-polyamine by the diamine.

The synthesis of the isocyanate-terminated urethane prepolymer used in this invention is carried out in the presence of an inert solvent, such as benzene, or in the absence of a solvent. When an aromatic diisocyanate is used with the polyhydroxyl compound, a reaction temperature of 60° to 100° C is used, and when an aliphatic or alicyclic diisocyanate is employed, a reaction temperature of 100° to 130° C is used.

In the preparation of the urethane prepolymer, it is preferred that the amount of the diisocyanate be chosen so that all of the OH groups of the polyhydroxyl compound which are reactive with isocyanate groups are completely reacted. In other words, it is preferred that the mole ratio of the total number of NCO groups to the total number of reactive hydrogen atoms (OH groups) be within a range of from 1.1 : 1.0 to 5.0 : 1.0.

It is preferred that the reaction between the isocyanateterminated urethane prepolymer and the polyalkylene-polyamine be carried out at a temperature of from —20° to +70° C, under atmospheric pressure, in a ketone-type solvent. As the ketone-type solvent, there can be used, for example, acetone, methylethyl ketone, diethyl ketone, dipropyl ketone, methylisobutyl ketone and methylisocpropyl ketone. In view of their industrial availability, acetone and methylethyl ketone are especially preferred. It is possible to use a mixture of a ketone-type solvent with benzene, tetrahydrofuran, dioxane, ethyl acetate, dimethyl formamide or a chlorinated solvent.

The reaction time is determined by the reaction temperature and the reactivity of the isocyanate-terminated urethane prepolymer. A shorter or longer reaction time can be used depending on the reaction conditions. The reaction is continued until the absorption at 2250 cm$^{-a}$ based on the —N=C=O group disappears in the infrared absorption spectrum of the reaction mixture. In general, the reaction is completed in 0.5 to 2 hours.

In the reaction of the polyalkylene-polyamine with the terminal isocyanate groups in the urethane prepolymer molecule, the terminal isocyanate groups react preferentially with secondary amino groups. It is critical that the total mole number of primary and secondary amino groups in the polyalkylene-polyamine is greater than the total mole number of isocyanate groups in the isocyanate-terminated urethane prepolymer. As the total mole number of the amino groups becomes close to the total mole number of the isocyanate groups, a polyurethane-urea-polyamine having a high molecular weight can be obtained, but the product is gelled or has a great tendency to gelation. If the mole ratio of the amino groups to the isocyanate groups is too high, the molecular weight of the resulting polyurethane-urea-polyamine becomes too low and resins possessing excellent physical properties cannot be obtained when such product is used as an intermediate for preparing the desired emulsion according to the invention.

The ratio of the number (b) of moles of active hydrogencontaining amino groups in the polyalkylene-polyamine to the number (a) of moles of isocyanate groups in the isocyanateterminated urethane prepolymer is within the range of $1 < b/a \leq 5$, preferably within the range of $1 < b/a \leq 3$.

It is preferred that the molecular weight of the thus formed polyurethane-urea-polyamine is within a range of from 5000 to 1000,000.

For introducing a long-chain alkyl group into the thus formed polyurethane-urea-polyamine, the following method is adopted.

A part of the amino groups (primary and secondary amino groups) in the molecule of the polyurethane-urea-polyamine is reacted with a long-chain alkyl isocyanate (inclusive of an alkyl isocyanate fromed from 1 mole of a long-chain alcohol and 1 mole of a diisocyanate), an α-olefin epoxide having a long-chain alkyl group or an acyl chloride having a long-chain alkyl group. The term "long-chain alkyl group" of said acyl chloride means alkyl groups having 12 to 22 carbon atoms. The sum of carbon atoms contained in said α-olefin epoxide ranges from 12 to 22.

As specific examples of alkyl isocyanates having an alkyl group of 12 to 22 carbon atoms tht can be used in this invention, there can be metioned dodecyl isocyanate, tetradecyl isocyanate, hexadecyl isocyanate, heptadecyl isocyanate, octadecyl isocyanate and mixtures of two or more of these isocyanates.

An the acyl chloride having an alkyl group of 12 to 22 carbon atoms, there can be mentioned, for example, lauroyl chloride, palmitoyl chloride, stearoyl chloride, behenoyl chloride and mixtures thereof.

As the α-olefin epoxide having from 12 to 22 carbon atoms, there can be mentioned, for example, dodecene oxide, tetradeceneoxide, hexadecene oxide, octadecene oxide, eicosene oxide, docosene oxide and mixtures thereof.

The compound supplying the long-chain alkyl group is used in an amount of 10 to 80 mole %, preferably 20 to 60 mole %, based on the number of moles of amino groups of the polyurethane-urea-polyamine. If the amount of the long-chain alkyl group is larger than 80 mole %, emulsification becomes difficult, and when the amount of the long-chaim alkyl group is smaller than 10 mole %, the fiber-softening effect of the emulsion is insufficient.

The reaction for introducing such long-chain alkyl group into the polyurethane-urea-polyamine is conducted in the same system in which the polyurethane-urea-polyamine has been previously prepared. The above-mentioned long-chain compound is added to the polyurethane-urea-polyamine and the reaction is carried out at 1of° to 70° for 1 to 5 hours.

Introduction of the long-chain alkyl group into the molecule of the polyurethane-urea-polyamine can also be accomplished by reacting an isocyanate-terminated urethane prepolymer with a polyamine already having a long-chain alkyl group present therein. According to this method, however, it is difficult to obtain a product of high molecular weight. Therefore, the method adopted in this invention wherein a polyurethane-urea-polyamine is first formed and it is then reacted with a long-chain alkyl group having such a highly reactive group as an isocyanate group, an epoxy group and an acyl chloride group can attain the desired object with greater assurance than the above alternative method.

Formation of an emulsion by dispersing in water the thus obtained polyurethan-urea-polyamine having a long-chain alkyl group is performed by methods such as those described below.

The polyurethane-urea-polyamine (I) having a long-chain alkyl grup is mixed with an aqueous solution of an acid, and then, the solvent is removed under reduced pressure, whereby there is obtained a cationic self-emulsifiable polyirethane emulsion. Furhter, the polyurethane-urea-polyamine (I) having a long-chain alkyl group can first be reacted with epichlorohydrin (or epibromohydrin) and the reaction above, whereby a reactive (cross-linkable) urethane emulsion can be obtained. See U.S. Ser. No. 505 536, filed Sep. 13, 1974, now Pat. No. 3,903,031, the entire contents of which are incorporated herein by reference.

Aqueous solutions of either an inorganic acid or an organic acid can be used in this invention. It is preferred to employ aqueous solutions of a monobasic acid such as hydrochloric acid, nitric acid, acetic acid, propionic acid, monochloroacetic acid and glycolic acid. The amount of the aqueous solution of the acid added to the polyurethane-urea-polyamine (I) having a long-chain alkyl group is such an amount that the pH of the emulsion is from about 5 to 7.

Still further, a urethane emulsion having a much higher reactivity can be obtained by reacting the polyurethane-urea-polyamine (I) having a long-chain alkyl group with epichlorohydrin (or epibromohydrin) in an amount equi-molar to the primary and amino groups in the molecule of (I) at 40° to 70° for 2 to 5 hours and then rendering the reaction product cationic in the same manner as described above.

According to the foregoing processes, there are obtained cationic polyurethane emulsions ordinarily having a resin content of 5 to 50 weight per cent.

When a fiber-containing article is treated with a polyurethane emulsion prepared according to the above-mentioned process, according to this invention, there is imparted to the treated article not only good elasticity and crease resistance, but also a soft touch. When the emulsion of this invention is impregnated into non-woven fabrics, papers, leathers, rubber articles, woods, metals, glass and plastics, or the emulsion is coated or sprayed onto surfaces of these articles and the treated articles are dried, the touch and physical properties of these articles are improved. Furher the polyurethane emulsion of this invention can be used for treatments of construction materials and as adhesives. Moreover, since the polyurethane emulsion of this invention has the structure of a macromolecular surface active agent, it can be used not only as a binder but also as an ordinary surface active agent. Thus, the polyurethane emulsion of this invention can be effectively used widely in various fields.

The polyurethane emulsion prepared according to this invention is a so-called self-emulsified emulsion, i.e. it is free of an emulsifier. However, if it is desired to improve the emulsion stability, it is permissibleto use a known emulsifier in such an amount as will not change greatly the properties of the polyurethane resin. Furhtermore, the polyurethane emulsion of this invention can be used not only singly but also in combination of other resins or the like provided that the resulting mixture is stable.

This invention will now be further described in detail by reference to the following illustrative Examples.

In the Examples, all references to "parts" and "per cent" are on a weight basis unless otherwise indicated.

EXAMPLE 1

90 parts of benzene and 34.8 parts of tolylene diisocyanate (80 : 20 mixture of 2,4- and 2,6-isomers) were added to 200 parts of polytetramethylene ether glycol (having an OH value of 56.3) which had been dehydrated at 120° C and 10 mm Hg for 30 minutes, and the mixture was agitated at 80° C for 1 hour. Then, the reaction mixture was allowed to cool in air to ambient room temperature to obtain an isocyanate-terminated urethane prepolymer in which the isocyanate group content was found to be 2.50 %.

A four-neck flask was charged with 120 parts of acetone and 2.52 parts (0.024 mole) of diethylene triamine, and while the charge was maintained below 10° C by external ice cooling with agitation, 68 parts (0.020 mole) of the above prepolymer solution was added dropwise to the charge of the flask over a period of 1 hours. The reaction was carried out at room temperature for 1 hour to obtain a solution of a polyurethane-urea-polyamine. While the solution was being agitated, 2.96 parts (0.01 mole) of octadecyl isocyanate was added to the solution, and the temperature was elevated to 50° C and the reaction was carried out for 30 minutes. Then, the reaction mixture was cooled to room temperature and a small amount of acetic acid was added thereto under agitation to adjust the pH to 5 to 6. Then, 600 parts of water was added to the reaction mixture, and the temperature was elevated to 50° to 60° C and the solent was distilled off under reduced pressure The, additional water was added to adjust the concentration. Thus, a stable aqueous emulsion having a resin content of 10% was obtained.

EXAMPLE 2

A polyurethane-urea-polyamine solution was prepared in the same manner as in Example 1, and 3.03 parts (0.01 mole) of stearoyl chloride, instead of the octadecyl isocyanate used in Exampel 1, was added dropwise to the polyurethane-urea-polyamine solution, and the reaction was carried out at 50° for 30 minutes under agitation. The reaction mixture was cooled to room temperature and a 10 % aqueous solution of hydrochloric acid was added to the reaction mixture under agitation to adjust the pH to 5 to 6. Then, 400 parts of water was added to the reaction mixture, the temperature was elevated to 50 to 60° C and the solvent was distilled off under reduced pressure. Then, additional water was added to adjust the concentration. Thus, a stable aqueous emulsion having a resin content of 10 % was obtained.

Comparative Example 1

A polyurethane-urea-polyamine solution was prepared in the same manner as in Example 1, and without using octadecyl ospcuamate. the pH of the solution was directly adjusted to 5 to 6 by addition of acetic acid. Then, 400 parts of water ws added to the solution, and the mixture was heated at 50° to 60° C under reduced pressure to remove the solvent. The concentration was adjusted by addition of water to obtain a stable aqueous emulsion having a resin content of 10 %.

EXAMPLE 3

90 parts of benzene and 34.8 parts of tolylene diisocyanate (80 : 20 mixture of 2,4- and 2,6-isomers) were added OH value of 56.31 ) which had been dehydrated at 120° C and 10 mm Hg for 30 minutes, and the mixture was agitated at 80° C for 1 hour. Then,the mixture was cooled to room temperature to obtain an isocyanate-terminated urethane prepolymer, in which the isocyanate content was found to be 2.50 %.

A four-neck flask was charged with 120 parts of acetone and 2.52 parts (0.024 mole) of diethylene triamine, and while the charge was mainatined below 10° C by external ice cooling under agitation, 68 parts (0.020 mole) of the above prepolymer solution was aded dropwise to the charge over a period of 1 hour. Then, the reaction was carried out at room temperature for 1 hour to obtain a polyurethane-urea-polyamine solution. The, 2.96 parts (0.01 mole) of octadecyl isocyanate was added to the solution under agitation, and the temperature was elevated to 50° C and the reaction was carried out for 30 minutes. Then, 2.04 parts (0.022 mole) of epichlorohydrin was added to the reaction mixture and the mixture was heated at 50° C and agitated for 1 hour. Then, the reaction mixture was cooled to room temperature and acetic acid was added under agitation to adjust the pH to 5 to 6. 400 parts of water was added to the resulting mixture, and the temperature was elevated to 50 to 60° C and the solvent was distilled off under reduced pressure. Then, the concentration was adjusted by addition of water to obtain a stable aqueous emulsion having a resin content of 10 %.

EXAMPLE 4

A polyurethane-urea-polyamine solution was prepared in the same manner as in Example 3, and 3.03 parts (0.01 mole) of stearoyl chloride, instead of the octadecyl isocyanate used in Example 3, was added dropwise to the polyurethane-urea-polyamine solution. The reaction was carried out at 50° C for 30 minutes. Then, 2.04 parts (0.022 mole) of epichlorohydrin was added to the reaction mixture and the mixture was heated at 50° C and agitated for 1 hours. The reaction mixture was then cooled to room temperature and a 10 % aqueous solution of hydrochloric acid was added thereto to adjust the pH to 5 to 6, followed by addition of 400 parts of water. Then, the temperature was elevated to 50° to 60° C and the solent was distilled off under reduced pressure. The concentration was adjusted by addition of water to obtain a stable aqueous emulsion having a resin content of 10 %.

EXAMPLE 5

A polyurethane-urea-polyamine solution was prepared in the same manner as in Example 3, and 2.60 parts (0.01 mole) of Nedox 1518 Olefin Oxide ($\alpha$-olefin epoxide having 15 to 18 carbon atoms on average manufactured by Adm Chemicals, Ashland Oil & Refining Co.) was added to the solution. The reaction was carried out at 50° C under agitation for 3 hours.

Then, 3.96 parts (0.032 mole) of epichlorohydrin was added to the reaction mixture, and the mixture was heated at 50° C and agitated for 30 minutes. Then, the reaction mixture was cooled to room temperature and a small amount of acetic acid was added thereto under agitation to adjust the pH to 5 to 7, followed by addition of 400 parts of water. Then, the temperature was elevated to 50° to 60° C and the solent ws distilled off under reduced pressure. Then, the concentration was adjusted by addition of wter to obtain a stable aqueous emulsion having a resin content of 10 %.

Comparative Example 2

A polyuretane-urea-polyamine solution was prepared in the same manner as in Example 3, and without using octadecyl isocyanate, 2.96 parts (0.032 mole) of epichlorohydrin was directly added to the thus formed solution. The mixture was heted at 50° C and agitated for 1 hour. Then the reaction mixture was cooled to room temperature and a small amount of acetic acid was added thereto under agitation to adjust the pH to 5 to 6, followed by addition of 400 parts of water. Then, the temperature was elevated to 50° to 60° C and the solvent was distilled off under reduced pressure. Then, the concentration was adjusted by addition of water to obtain a stable aqueous solution having a resin content of 10%.

PropertyTests of Fabrics Treated with Cationic Emulsions:
1. Treatment of Polyester jersey fabric:
   Scoured polyester jersey fabric (dyed in a beige color with disperse dyes) was treated under the following conditions and the properties of the treated fabric were tested.

Testing Conditions (Preparation of Sample Fabrics):
Sample cloths were immersed in solutions of 0.3 % solids content, prepared from the resin emulsions obtained in Examples 1 to 5 and Comparative Examples 1 and 2, respectively. Each sample was squeezed at a ratio of 100 % on the weight of the sample by a mangle. This means that there is on the sample the same amount of said solution as that of the sample itself, calculated from the following equation:

$$\frac{\text{(the weight of a squeezed sample)} - \text{(the weight of a sample not treated)}}{\text{(the weight of a sample not treated)}} \times 100$$

This immersing-sqeezing procedure was conducted once more.

Each sample was dried by hot air at 100° C for 5 minutes and heat-set at 150° C for 3 minutes by a pin tenter. The results of the property tests on these samples are shown in the following Table.

The urethane resin sample was used in an amount of 0.5 % based on the weight of the cloth, and the sample cloth was immersed at a bath ratio of 1 : 30 for 15 minutes at 40° C and was squeezed at a ratio of 30 % on the weight of the cloth by a centrifugal dehydrator. Then, the sample cloth was dried by hot air at 80° C for Table

| | Test Results Properties | | | | | |
|---|---|---|---|---|---|---|
| | Modulus (%) of Elasticity under Compression | | Softness (g) | | Dye Fastness to Rubbing | |
| Treating Agent | just after treatment | after 5 cycles of washing | just after treatment | after 5 cycles of washing | just after treatment | after 5 cycles of washing |
| Example 1 | 65 | 55 | 31 | 34 | 4 – 5 | 4 |
| Example 2 | 66 | 54 | 33 | 35 | 4 – 5 | 4 |
| Example 3 | 68 | 61 | 32 | 32 | 4 – 5 | 4 |
| Example 4 | 71 | 63 | 32 | 32 | 4 – 5 | 4 |
| Example 5 | 67 | 60 | 31 | 32 | 4 – 5 | 4 |
| Comparative Example 1 | 66 | 56 | 41 | 38 | 4 – 5 | 4 |
| Comparative Example 2 | 68 | 60 | 43 | 41 | 4 – 5 | 4 |
| Untreated Control | 49 | 51 | 37 | 36 | 4 – 5 | 4 – 5 |

Evaluation of Properties

Modulus of Elasticity under Compression:

According to JIS L-1018 (1970), three sample cloths having the size of 3 cm × 3 cm were piled on top of one another, the measurement of the modulus was conducted, and the positions of the sample cloths were changed and the same measurement was conducted again. Each valve shown in the Table is an average value obtained by conducting the measurement three times.

Softness:

The maximum flexural load of the sample was determined with respect to either the warp direction or the weft direction by means of a handle-ometer (manufactured by Kumagaya Riki Kogyo K. K.), and the softness was evaluated based on the sum of the values obtained with respect to the warp and weft directions. A lower value indicates a higher softness.

Dye Fastness to Rubbing:

The fastness was determined by using a tester of Gakushintype and evaluated according to the scale of JIS L-0849.

Washing Conditions:

The washing was conducted at 40° C for 20 minutes by using a laundry tester and a 0.2 % aqueous solution of New Wonderful (detergent manufactured by Kao Soap Co.), and the sample was washed 2 times with water. This procedure is defined as "one cycle of washing". Finally, the sample was dried at 80 ° C for 30 minutes.

2. Treatment of Acrylic jersey fabric:

Sample cloth tested: Acrylic jersey fabric which had been scoured.

Treating Conditions:

30 minutes.

Test results obtained are as shown in the following Table.

Table

| | Test Results | |
|---|---|---|
| | Softness (g) | |
| Sample Cloth | just after treatment | after 5 cycles of washing |
| cloth treated with emulsion of Example 1 | 24.5 | 27.6 |
| cloth treated with emulsion of Example 3 | 24.7 | 25.2 |
| cloth treated with emulsion of Comparative Example 1 | 33.2 | 33.8 |
| untreated sample | 36.2 | 35.5 |

Note: the softness was measured according to the method described in Example 1.

An embodiment of the invention in which an exclusive property or privilege is claimed are defined as follows:

1. A process for preparing a cationic polyurethane aqueous emulsion, which comprises:
   1. reacting, in the liquid phase and in a ketone solvent, at a temperature of from −20° to +70° C, (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups, said polyalkylene polyamine having the formula

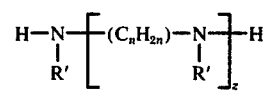

wherein $n$ is an integer larger than one, $z$ is an integer from 2 to 4 and R' is hydrogen, alkyl having one to 4 carbon atoms or hydroxyalkyl having one to 4 carbon atoms, the ratio of (b) the total mole number of primary and secondary amino groups containing active hydrogen atoms in the polyalkylene polyamine to (a) the total mole number of isocyanate groups in the isocyanate-terminated urethane prepolymer being within the range of $1 < b/a \leq 5$, the reaction being carried out until the presence of —NCO groups cannot be detected, whereby to form polyurethane-urea-polyamine, 2. reacting with the polyurethane-urea-polyamine of step 1, a substance selected from the group consisting of alkyl isocyanates having an alkyl group containing 12 to 22 carbon atoms, acyl chlorides having an alkyl group containing 12 to 22 carbon atoms and α-olefin epoxides having from 12 to 22 carbon atoms, to form an alkyl-substituted polyurethane-urea-polyamine, the amount of said substance being from 10 to 80 mole %, based on the number of moles of amino groups in the molecule of said polyurethane-urea-polyamine, 3. adding to the reaction product of step 2 an aqueous solution of an acid to form an emulsion, the amount of said acid being an amount such that the pH of polyurethane-urea-polyamine emulsion is within the range of about 5 to about 7, and 4. treating the product of step 3 to remove the organic solvent therefrom and thereby obtaining an aqueous cationic polyurethane emulsion as a final product.

2. A process according to claim 1, in which the reactant (B) includes up to 50 percent, by molecular equivalent, of diamines or alkylene oxide adducts, acrylonitrile adducts or acrylate adducts of diamines.

3. A process according to claim 1, in which the said ratio is in the range of $1 < b/a \leq 3$.

4. A process according to claim 1, in which said acid is selected from the group consisting of hydrochloric acid, nitric acid, acetic acid, propionic acid, monochloroacetic acid and glycolic acid.

5. A process according to claim 1, wherein the amount of said substance employed in step 2 is from 20 to 60 mole % based on the number of moles of amino groups in the molecule of the polyurethane-urea-polyamine.

6. A process according to claim 1, in which step 2 is carried out at a temperature of 10° to 70° C, for from 1 to 5 hours.

7. A process according to claim 1, in which between steps 2 and 3, the reaction product of step 2 is reacted with epichlorohydrin or epibromohydrin at 40° to 70° C, for 2 to 5 hours in an amount equimolar to the primary and secondary amino groups in the molecule of the alkyl-substituted poly-urethane-urea-polyamine.

* * * * *